United States Patent [19]

Wilson et al.

[11] 4,421,727
[45] Dec. 20, 1983

[54] $NF_4+WF_7^-$ AND $NF_4+UF_7^-$ AND METHODS OF PREPARATION

[75] Inventors: William W. Wilson, Simi Valley; Karl O. Christe, Calabasas, both of Calif.

[73] Assignee: The United States of America as represented by the Secretary of the Navy, Washington, D.C.

[21] Appl. No.: 392,100

[22] Filed: Jun. 25, 1982

[51] Int. Cl.³ .................... C01G 43/00; C01G 41/00; C01B 21/083

[52] U.S. Cl. ...................... 423/253; 423/19; 423/59; 423/351; 149/119

[58] Field of Search ............ 423/19, 59, 253, 351; 149/119

[56] References Cited

U.S. PATENT DOCUMENTS

| | | | |
|---|---|---|---|
| 3,039,846 | 6/1962 | Ogle | 423/253 |
| 3,383,183 | 5/1968 | Grant | 423/19 |
| 3,765,174 | 10/1973 | MacLaren | 149/119 |
| 3,794,716 | 2/1974 | Ogle | 423/253 |
| 4,003,771 | 1/1977 | Lubowitz | 149/119 |
| 4,169,132 | 9/1979 | Neff et al. | 423/351 |
| 4,207,124 | 6/1980 | Christe | 149/119 |

OTHER PUBLICATIONS

Wilson et al., *J. Inorg. Nucl. Chem.*, 43, pp. 1551-1553 (1981).
Wilson et al., *Inorg. Chem.*, 1981, (20), 4139-4143.
Kigoshi, *Thermochimica Acta.*, 29 (1979), 147-155.
Kunze et al., *J. Chem. Soc., Dalton Trans.*, 1978, (5), 443-440.
George et al., *Chem. Abs.*, 90, Abs. #153359e (1979), p. 321.-

*Primary Examiner*—Edward A. Miller
*Attorney, Agent, or Firm*—R. F. Beers; K. E. Walden; R. D. Johnson

[57] ABSTRACT

Salts of the formula $NH_4+MH_7^-$ are produced by the following reaction

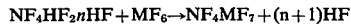

$$NF_4HF_2nHF + MF_6 \rightarrow NF_4MF_7 + (n+1)HF$$

wherein M is uranium (U) or tungsten (W).

8 Claims, No Drawings

$NF_4^+WF_7^-$ AND $NF_4^+UF_7^-$ AND METHODS OF PREPARATION

BACKGROUND OF THE INVENTION

1. Field of the Invention

This invention relates to energetic inorganic salts and more particularly to salts containing the $NF_4^+$ cation.

2. Description of the Prior Art $NF_4^+$ salts are key ingredients for solid propellant $NF_3-F_2$ gas generators, as shown by D. Pilipocich in U.S. Pat. No. 3,963,542, and for high detonation pressure explosives, as shown by K. O. Christe in U.S. Pat. No. 4,207,124. The synthesis of $NF_4^+$ salts is unusually difficult because the parent molecule $NF_5$ does not exist and the salts must be prepared from $NF_3$ which amounts formally to a transfer of $F^+$ to $NF_3$ accordingly to:

$$NF_3 + F^+ \rightarrow NF_4^+$$

Since fluorine is the most electronegative of all elements, $F^+$ cannot be generated by chemical means. This difficult synthetic problem was overcome by K. O. Christe and co-workers, as shown in U.S. Pat. No. 3,503,719. By the use of an activation energy source and a strong volatile Lewis acid, such as $AsF_5$, the conversion of $NF_3$ and $F_2$ to an $NF_4^+$ salt became possible:

$$NF_3 + F_2 + AsF_5 \xrightarrow{\Delta E} NF_4^+AsF_6^-$$

However, only few Lewis acids are known which possess sufficient strength and acidity to be effective in this reaction. Therefore, other indirect methods were needed which allowed conversion of the readily accessible $NF_4^+$ salts into other new salts. Two such methods are presently known. The first one involves the displacement of a weaker Lewis acid by a stronger Lewis acid, as shown by K. O. Christe and C. J. Schack in U.S. Pat. No. 4,172,881 for the system:

$$NF_4BF_4 + PF_5 \rightarrow NF_4PF_6 + BF_3$$

but obviously is again limited to strong Lewis acids. The second method is based on metathesis, i.e., taking advantages of the different solubilities of $NF_4^+$ salts in solvents such as HF or $BrF_5$. For example, $NF_4SbF_6$ can be converted to $NF_4BF_4$ according to:

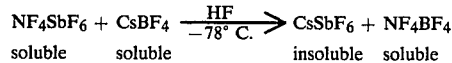

$$\underset{\text{soluble}}{NF_4SbF_6} + \underset{\text{soluble}}{CsBF_4} \xrightarrow[-78^\circ C.]{HF} \underset{\text{insoluble}}{CsSbF_6} + \underset{\text{soluble}}{NF_4BF_4}$$

This method has successfully been applied by K. O. Christe and coworkers, as shown in U.S. Pat. Nos. 4,108,965; 4,152,406; and 4,172,884, to the syntheses of several new salts. However, this method is limited to salts which have the necessary solubilities and are stable in the required solvent. The limitations of the above two methods are quite obvious and preempted the syntheses of $NF_4^+$ salts of anions which are either insoluble in those solvents or are derived from a Lewis acid weaker than the solvent itself and therefore are displaced from their salts by the solvent.

SUMMARY OF THE INVENTION

Accordingly an object of this invention is to provide methods which permit the syntheses of new $NF_4^+$ salts containing anions derived from very weak Lewis acids.

Another object of this invention is to provide new energetic $NF_4^+$ compositions which are useful in explosives and solid propellants.

A further object of this invention is to provide $NF_4^+$ compositions for solid propellant $NF_3-F_2$ gas generators for chemical HF-DF lasers which deliver a maximum of $NF_3$ and $F_2$ while not producing any gases which deactivate the chemical laser.

Yet another object of this invention is to provide $NF_4$ fluorotungstates which on burning with tungsten powder can produce hot $WF_6$ gas in high yield.

These and other objects of this invention are achieved by providing:

Salts of the formula $NF_4^+MF_7^-$ by the following reaction $$NF_4HF_2 \cdot nHF + MF_6 \rightleftharpoons NF_4MF_7 + (n+1)HF$$

wherein M is uranium (U) or tungsten (W). These salts are useful as ingredients in solid propellants and in high detonation pressure explosives.

A method of generating hot $WF_6$ gas by burning a mixture of $NF_4WF_7$ and tungsten metal.

DETAILED DESCRIPTION OF THE PREFERRED EMBODIMENT

Surprisingly, it has now been found that the salts $NF_4UF_7$ and $NF_4WF_7$ can be prepared from the very weak and volatile Lewis acids $UF_6$ and $WF_6$. The salts are prepared by the following methods.

First, readily available $NF_4SbF_6$ salt is converted by metathesis into $NF_4HF_2$ according to the reaction

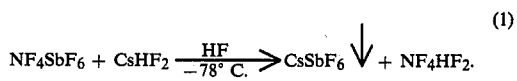

$$NF_4SbF_6 + CsHF_2 \xrightarrow[-78^\circ C.]{HF} CsSbF_6 \downarrow + NF_4HF_2. \quad (1)$$

The details of this procedure are disclosed by K. O. Christe, W. W. Wilson, and R. D. Wilson in Inorg. Chem., 19, pp. 1494+(1980), herein incorporated by reference. A method of preparing $NF_4SbF_6$ is disclosed by K. O. Christe, C. J. Schack, and R. D. Wilson, J. Fluorine Chem., 8, pp. 541+(1976), herein incorporated by reference.

The $NF_4HF_2$ produced by the above procedure will be complexed with HF and can be represented by the formula $NF_4HF_2 \cdot nHF$. Because HF is a stronger Lewis acid than either $UF_6$ or $WF_6$, as much HF as possible has to be removed from the $NF_4HF_2$ without decomposing the $NF_4HF_2$. This can be achieved by judicious pumping at about $0^\circ$ C. This is continued until a solid having the composition $NF_4HF_2 \cdot nHF$ wherein n is from about 0.5 to about 10.0 is obtained.

$NF_4UF_7$ and $NF_4WF_7$ are produced by the following reactions:

$$NF_4HF_2 \cdot nHF + UF_6 \rightleftharpoons NF_4UF_7 + (n+1)HF \quad (2)$$

$$NF_4HF_2 \cdot nHF + WF_6 \rightleftharpoons NF_4WF_7 + (n+1)HF. \quad (3)$$

These reactions may be run at ambient ($25^\circ$ C.) temperature. Repeated treatments of $NF_4HF_2 \cdot nHF$ with a large excess of $UF_6$ or $WF_6$, followed by the removal of the volatile products at ambient temperatures, surprisingly shifted the equilibrium in reaction (2) and the equilibrium in reaction (3) quanitatively to the right. This is probably due to the thermal stability of $NF_4UF_7$ and of $NF_4WF_7$ being significantly higher than that of $NF_4HF_2$.

The addition of $UF_6$ or $WF_6$ and subsequent evacuation of volatile reaction products is continued until the conversion of $NF_4HF_2 \cdot nHF$ to $NF_4UF_7$ or $NF_4WF_7$ is substantially completed. This will be the point at which no significant amount of $UF_6$ or $WF_6$ is taken up and no significant amount of volatile reaction products (e.g., HF gas) is generated. Thus, by monitoring the gases evacuated from the reaction chamber, the progress of the reaction may be monitored.

Examples 1 and 2 further illustrate these procedures.

$NF_4UF_7$ and $NF_4WF_7$ are useful as key ingredients for solid propellant $NF_3$–$F_2$ gas generators and for high detonation pressure explosives.

$NF_4WF_7$ is of particular interest as an ingredient for hot $WF_6$ gas generators. Hot $WF_6$ is an excellent electron capturing agent and therefore useful for reducing radar signatures. For example, formulations based on

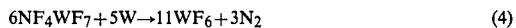

$$6NF_4WF_7 + 5W \rightarrow 11WF_6 + 3N_2 \qquad (4)$$

can theoretically produce up to 97 weight percent of $WF_6$ with flame temperatures in excess of 2000° C. A pyrotechnic mixture of finely powdered $NF_4WF_7$ and tungsten in approxiately a 6:5 molar ratio may be used.

The general nature of the invention having been set forth, the following examples are presented as specific illustrations thereof. It will be understood that the invention is not limited to these examples but is susceptible to various modifications that will be recognized by one of ordinary skill in the art.

EXAMPLE 1

Preparation of $NF_4WF_7$

Dry CsF (15.0 mmol) and $NF_4SbF_6$ (15.0 mmol) were loaded in the drybox into one half of a prepassivated Teflon double U-metathesis apparatus. Dry HF (15 ml liquid) was added on the vacuum line and the mixture was stirred with a Teflon coated magnetic stirring bar for 15 minutes at 25° C. After cooling the apparatus to −78° C., it was inverted and the $NF_4HF_2$ solution was filtered into the other half of the apparatus. Tungsten hexafluoride (22.5 mmol) was condensed at −196° C. onto the $NF_4HF_2$. The mixture was warmed to ambient temperature, and two immiscible liquid phases were observed. After vigorous stirring for 30 minutes at 25° C., the lower $WF_6$ layer dissolved in the upper HF phase. Most of the volatile products were pumped off at ambient temperature until the onset of $NF_4HF_2$ decomposition became noticeable ($NF_3$ evolution). An additional 8.0 mmol of $WF_6$ was added at −196° C. to the residue. When the mixture was warmed to ambient temperature, a white solid product appeared in the form of a slurry. All material volatile at −31° C. was pumped off for 1 hour and consisted of HF and some $NF_3$. An additional 14.5 mmol of $WF_6$ was added to the residue and the resulting mixture was kept at 25° C. for 14 hours. All material volatile at −13° C. was pumped off for 2 hours and consisted of HF and $WF_6$. The residue was kept at 22° C. for 2.5 days and pumping was resumed at −13° C. for 2.5 hours and at 22° C. for 4 hours. The volatiles collected at −210° C., consisted of some HF and small amounts of $NF_3$ and $WF_6$. The white solid residue (5.138 g, 84% yield) was shown by vibrational and $^{19}F$ NMR spectroscopy to consist mainly of $NF_4WF_7$ with small amounts of $SbF_6^-$ as the only detectable impurity. Based on its elemental analysis, the product had the following composition (weight %):

$NF_4WF_7$, 98.39; $CsSbF_6$, 1.61. Anal. Calcd: $NF_3$, 17.17; W, 44.46; Cs, 0.58; Sb, 0.53. Found. $NF_3$, 17.13: W, 44.49; Cs, 0.54; Sb, 0.55.

EXAMPLE 2

Preparation of $NF_4UF_7$

A solution of $NF_4HF_2$ in anhydrous HF was prepared from CsF (14.12 mmol) and $NF_4SbF_6$ (14.19 mmol) in the same manner as described for example 1 ($NF_4WF_7$). Most of the HF solvent was pumped off on warm up from −78° C. towards ambient temperature, until the onset of $NF_4HF_2$ decomposition became noticeable. Uranium hexafluoride (14.59 mmol) was condensed at −196° C. into the reactor, and the mixture was stirred at 25° C. for 20 hours. The material volatile at 25° was briefly pumped off and separated by fractional condensation through traps kept at −78°, −126° and −210° C. It consisted of HF (6.3 mmol), $UF_6$ (9.58 mmol) and a trace of $NF_3$. Since the $NF_4HF_2$ solution had taken up only about one third of the stoichiometric amount of $UF_6$, the recovered $UF_6$ was condensed back into the reactor. The mixture was stirred at 25° C. for 12 hours and the volatile material was pumped off again and separated. It consisted of HF (12.8 mmol), $UF_6$ (1.7 mmol) and a trace of $NF_3$. Continued pumping resulted in the evolution of only a small amount of $UF_6$, but no $NF_3$ or HF, thus indicating the absence of any unreacted $NF_4HF_2$. The pale yellow solid residue (5.711 g, 88% yield) was shown by vibrational and $^{19}F$ NMR spectroscopy and elemental analysis to have the following composition (weight %): $NF_4UF_7$, 97.47; $NF_4SbF_6$, 1.50; $CsSbF_6$, 1.03. Anal. Calcd: $NF_3$, 15.34; U, 50.32; Sb, 0.90; Cs, 0.37. Found: $NF_3$, 15.31 U, 50.2; Sb, 0.90; Cs, 0.37.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. $NF_4UF_7$.
2. $NF_4WF_7$.
3. A process or preparing $NF_4UF_7$ comprising the following steps in order:
    (1) placing $NF_4HF_2 \cdot nHF$ into a reaction vessel;
    (2) adding an excess of $UF_6$ to the reaction vessel;
    (3) allowing the $UF_6$ to react with the $NF_4HF_2 \cdot nHF$;
    (4) pumping off the volatile products of the reaction; and
    (5) repeating steps (2) through (4) until the $NF_4HF_2 \cdot nHF$ is substantially converted to $NF_4UF_7$.
4. The process of claim 3 wherein n is from about 0.5 to about 10.0.
5. The process of claim 3 wherein steps (2), (3), and (4) are performed at ambient temperature.
6. A process for preparing $NF_4WF_7$ comprising the following steps in order:
    (1) placing $NF_4HF_2 \cdot nHF$ into a reaction vessel;
    (2) adding an excess of $WF_6$ to the reaction vessel;

(3) allowing the $WF_6$ to react with the $NF_4HF_2 \cdot nHF$;

(4) pumping off the volatile products of the reaction; and (5) repeating steps (2) through (4) until the $NF_4HF_2 \cdot nHF$ is substantially converted to $NF_4WF_7$.

7. The process of claim 6 wherein n is from about 0.5 to about 10.0.

8. The process of claim 6 wherein steps (2), (3), and (4) are performed at ambient temperature.

* * * * *